United States Patent
Sugawara et al.

(10) Patent No.: US 6,540,017 B2
(45) Date of Patent: Apr. 1, 2003

(54) AIR CONDITIONER AND METHOD FOR CONTROLLING THE SAME

(75) Inventors: Sakuo Sugawara, Tokyo (JP); Shinichi Suzuki, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 9 days.

(21) Appl. No.: 09/816,097

(22) Filed: Mar. 26, 2001

(65) Prior Publication Data

US 2001/0027862 A1 Oct. 11, 2001

(30) Foreign Application Priority Data

Mar. 27, 2000 (JP) ........................................ 2000-086320

(51) Int. Cl.[7] .............................. F23N 5/20; F24F 11/00
(52) U.S. Cl. ..................................... 165/238; 236/46 R
(58) Field of Search ................................ 236/46 R, 47; 165/238; 62/231

(56) References Cited

U.S. PATENT DOCUMENTS

| | | | | |
|---|---|---|---|---|
| 4,335,847 A | * | 6/1982 | Levine | 236/46 R |
| 4,469,274 A | * | 9/1984 | Levine | 236/46 R |
| 4,557,317 A | | 12/1985 | Harmon, Jr. | 236/46 R X |
| 5,873,519 A | | 2/1999 | Beilfuss | 236/46 R |

FOREIGN PATENT DOCUMENTS

| | | |
|---|---|---|
| EP | 0 890 893 | 1/1999 |
| GB | 2 224 863 | 5/1990 |
| JP | 62-33239 | 2/1987 |
| JP | 2-101344 | 4/1990 |
| JP | 4-126941 | 4/1992 |
| JP | 4-244545 | 9/1992 |
| JP | 4-281139 | 10/1992 |
| JP | 6-82077 | 3/1994 |
| JP | 10-300164 | 11/1998 |

* cited by examiner

*Primary Examiner*—William Wayner
(74) *Attorney, Agent, or Firm*—Oblon, Spivak, McClelland, Maier & Neustadt, P.C.

(57) ABSTRACT

A user enters a thermal perception level or a temperature set point in a perception level and temperature entry portion. Then, a clock portion calculates, by clocking, the time of entry to the perception level and temperature entry portion, and the entered temperature set point is stored as a temperature set point of an individual time interval in a temperature set point memory portion. When no entry is available to the perception level and temperature entry portion, air conditioning power is controlled in accordance with a temperature that has been already stored in the temperature set point memory portion.

6 Claims, 14 Drawing Sheets

OPERATION MODE: COOLING CYCLE OF OPERATION

| TIME INTERVAL (ONE-HOUR) | 8-O'CLOCK INTERVAL | 9-O'CLOCK INTERVAL | 10-O'CLOCK INTERVAL | 11-O'CLOCK INTERVAL | 12-O'CLOCK INTERVAL | 13-O'CLOCK INTERVAL | 14-O'CLOCK INTERVAL | 15-O'CLOCK INTERVAL | 16-O'CLOCK INTERVAL | 17-O'CLOCK INTERVAL |
|---|---|---|---|---|---|---|---|---|---|---|
| TEMPERATURE SET POINT (°C) | 26 | 28 | 28 | 28 | 25 | 27 | 27 | 27 | 27 | 26 |

*FIG. 4A*

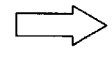

| TIME INTERVAL (ONE-HOUR) | 8-O'CLOCK INTERVAL | 9-O'CLOCK INTERVAL | 10-O'CLOCK INTERVAL | 11-O'CLOCK INTERVAL | 12-O'CLOCK INTERVAL | 13-O'CLOCK INTERVAL | 14-O'CLOCK INTERVAL | 15-O'CLOCK INTERVAL | 16-O'CLOCK INTERVAL | 17-O'CLOCK INTERVAL |
|---|---|---|---|---|---|---|---|---|---|---|
| TEMPERATURE SET POINT (°C) | 26 | 28 | 28 | 28 | 25 | 26 | 27 | 27 | 27 | 26 |

*FIG. 4B*

OPERATION MODE: COOLING CYCLE OF OPERATION

| TIME INTERVAL (ONE-HOUR) | 8-O'CLOCK INTERVAL | 9-O'CLOCK INTERVAL | 10-O'CLOCK INTERVAL | 11-O'CLOCK INTERVAL | 12-O'CLOCK INTERVAL | 13-O'CLOCK INTERVAL | 14-O'CLOCK INTERVAL | 15-O'CLOCK INTERVAL | 16-O'CLOCK INTERVAL | 17-O'CLOCK INTERVAL |
|---|---|---|---|---|---|---|---|---|---|---|
| TEMPERATURE SET POINT (°C) | 26 | 28 | 28 | 28 | 25 | 27 | 27 | 27 | 27 | 26 |

*FIG. 6A*

| TIME INTERVAL (ONE-HOUR) | 8-O'CLOCK INTERVAL | 9-O'CLOCK INTERVAL | 10-O'CLOCK INTERVAL | 11-O'CLOCK INTERVAL | 12-O'CLOCK INTERVAL | 13-O'CLOCK INTERVAL | 14-O'CLOCK INTERVAL | 15-O'CLOCK INTERVAL | 16-O'CLOCK INTERVAL | 17-O'CLOCK INTERVAL |
|---|---|---|---|---|---|---|---|---|---|---|
| TEMPERATURE SET POINT (°C) | 26 | 28 | 28 | 28 | 25 | 26 | 26 | 27 | 27 | 26 |

*FIG. 6B*

AIR CONDITIONER AND METHOD FOR CONTROLLING THE SAME

BACKGROUND OF THE INVENTION

1. Field of the Invention

The present invention relates to an air conditioner and a method for controlling the air conditioner, which provide a comfortable environment to a person's perception that changes according to each of life scenes.

2. Description of the Prior Art

The thermal perception of a human body is determined by temperatures, humidity, radiation, and airflow speeds, which are referred to as the four factors of thermal environment, and the human factors, that is, the amount of clothes worn by and the activity level of a person. In general, the air conditioner controls the temperature and humidity of the four factors of thermal environment and is intended to adjust them to a constant value. However, as mentioned above, the thermal perception of a person is susceptible to the human factors such as the amount of clothes worn by and the activity level of the person. That is, the person lives a variable life, and accordingly the amount of clothes and the activity level of the person vary in the variable life, thereby conceivably causing the perception level of the person to change. The activity level is varied by the walk, posture, motion, work or the like of the person, thereby causing the environment to change, in which the person feels comfortable, depending on the behavior and the way of living of the person. Therefore, it is necessary to create a dwelling environment suitable for the variable life in order to control the environment at all times to be comfortable.

The varying life can be classified according to the scenes of the life, for example, the scenes of sleeping, going-out, staying at home or the like. In the scene of sleeping, the activity level becomes significantly low and the bedding is added to the clothes worn by the person. Thus, this makes the human factors totally different from that at the awakening time such as the scene of staying at home, so as to obviously bring about a different comfortable environment. Conventionally, to create a comfortable dwelling environment at the time according to the person's thermal perception level that varies depending on the life scene, a user has set or changed on an as-needed basis the temperature set point or the state of operation of an air conditioner to use it.

On the other hand, as an example of operation control in each of the life scenes, an air conditioner that provides comfort to a life scene of sleeping and energy saving is disclosed in Japanese Patent Laid-Open Publication No.Sho 62-33239. FIG. 14 is a timing chart of voltages corresponding to shifted temperatures in a conventional air conditioner. As illustrated, the temperature set point is shifted when the user turns on the "sleep" mode switch at bedtime, and control is performed to make a shifting amount and a time interval (elapse time) of the temperature set point larger stepwise.

The temperature set point is shifted stepwise by a small amount at first and then by a larger amount. In this manner, a greater amount of temperature shift can be finally obtained than an amount of temperature shift obtained by a temperature stepwise shifting by the same amount, provided that the number of shifting is the same, so that energy saving is improved. In addition, a time interval of temperature shift is changed according to the shifting amount of the temperature, thereby exerting no adverse effect on the comfort level of a person in bed.

Furthermore, for example, an air conditioner that is designed with particular attention to a difference in the activity level and the amount of clothes between the periods of awakening and sleeping in the sleeping scene is disclosed in Japanese Patent Laid-Open Publication No.Hei 4-126941. FIG. 15 is a timing chart of shifted temperatures of the conventional air conditioner. As illustrated, with this air conditioner, the user is allowed to enter (set) the desired temperature set points for bedtime and rising time independently of the temperature set point for the time of awakening. The temperature set point is shifted automatically toward the rising time so that the temperature set point for the rising time is reached at the rising time. To provide a comfortable temperature set point during sleeping, comfort can be provided by temperature set points independent of that for awakening time which are the temperature set points for the bedtime and rising time arbitrarily set. That is, the temperature set points for the bedtime and rising time can be set by the user to his or her preferences, thereby implementing a dwelling environment (sleeping environment) which is closer to the one desired by the user.

However, the air conditioner configured as described above has required an inconvenient operation for a user to change on an as-needed basis the temperature set point or the like of the air conditioner, in order to create a comfortable dwelling environment according to different occasions. Moreover, in some cases, eliminating the inconvenient operation of changing the temperature set point resulted in failing to realize a comfort dwelling environment, and in operating the air conditioner without taking the energy saving into consideration.

On the other hand, even in the air conditioner of the prior art example provided with operation control for each life scene, a temperature set point could not be set arbitrarily for the life scene and only one pattern for changing the temperature set point was provided, not necessarily realizing energy saving.

SUMMARY OF THE INVENTION

The present invention was developed to solve the aforementioned problems. It is an object of the present invention to provide an air conditioner which can provide a comfortable environment desired by the user for 24 hours with a simplified operation and improve the level of energy saving without impairing a comfortable dwelling environment. Accordingly, the present invention provides the following effects.

The air conditioner according to the present invention eliminates the user's inconvenience of changing on an as-needed basis the temperature set point or the like of the air conditioner and stores temperature set points for each predetermined time interval. This makes it possible to realize a comfortable dwelling environment for 24 hours desired by the user differently corresponding to a life scene according to an occasion.

Furthermore, the air conditioner according to the present invention stores a temperature set point for each operation pattern of a cooling and heating cycle of operation. This makes it possible to realize a comfortable dwelling environment according to each operation pattern even in an air conditioner having a plurality of operation patterns.

Furthermore, the air conditioner according to the present invention can carry out control in consideration of air conditioning load as far as possible without worsening a comfortable dwelling environment for 24 hours desired by the user corresponding to a life scene according to an occasion, so that improved energy saving can be expected.

Furthermore, the air conditioner according to the present invention has a plurality of temperature change patterns representative of temperature shifts of room temperature. This provides more degrees of freedom for control than one with only one temperature change pattern. This makes it possible to realize a comfortable dwelling environment desired by the user differently corresponding to a life scene according to an occasion, so that improved energy saving can be expected.

Furthermore, the air conditioner according to the present invention selects a temperature change pattern among a plurality of temperature change patterns, that provides less air conditioning load, so that improved energy saving can be expected.

Furthermore, the air conditioner according to the present invention organizes fundamental ones of the life scenes of a person in a framework. This makes it possible to carry out air conditioning suitable for each life scene and realize a comfortable dwelling environment desired by the user corresponding to each fundamental life scene.

Furthermore, the air conditioner according to the present invention includes at least a sleep scene as a fundamental life scene and provides reduced noise from the indoor air blower during the sleep scene, so that a comfortable sleeping environment without noise can be provided.

Furthermore, the method for controlling an air conditioner according to the present invention has the step of storing an operation condition for each predetermined time interval, so that a comfortable dwelling environment desired by the user differently corresponding to a life scene according to an occasion can be realized.

Furthermore, the method for controlling an air conditioner according to the present invention eliminates the user's inconvenience of changing on an as-needed basis the temperature set point or the like of the air conditioner and stores temperature set points for each predetermined time interval. This makes it possible to realize a comfortable dwelling environment for 24 hours desired by the user differently corresponding to a life scene according to an occasion.

Furthermore, the method for controlling an air conditioner according to the present invention has a plurality of temperature change patterns representative of temperature shifts of room temperature. This provides more degrees of freedom for control than one with only one temperature change pattern. This makes it possible to realize a comfortable dwelling environment desired by the user differently corresponding to a life scene according to an occasion, so that improved energy saving can be expected.

BRIEF DESCRIPTION OF THE DRAWINGS

FIG. 4 shows tables of temperature set points stored in a temperature set point memory portion according to the first embodiment of the present invention.

FIG. 6 shows tables of temperature set points stored in a temperature set point memory portion according to a second embodiment of the present invention.

DETAILED DESCRIPTION OF THE PREFERRED EMBODIMENTS

First Embodiment

Figure 1:
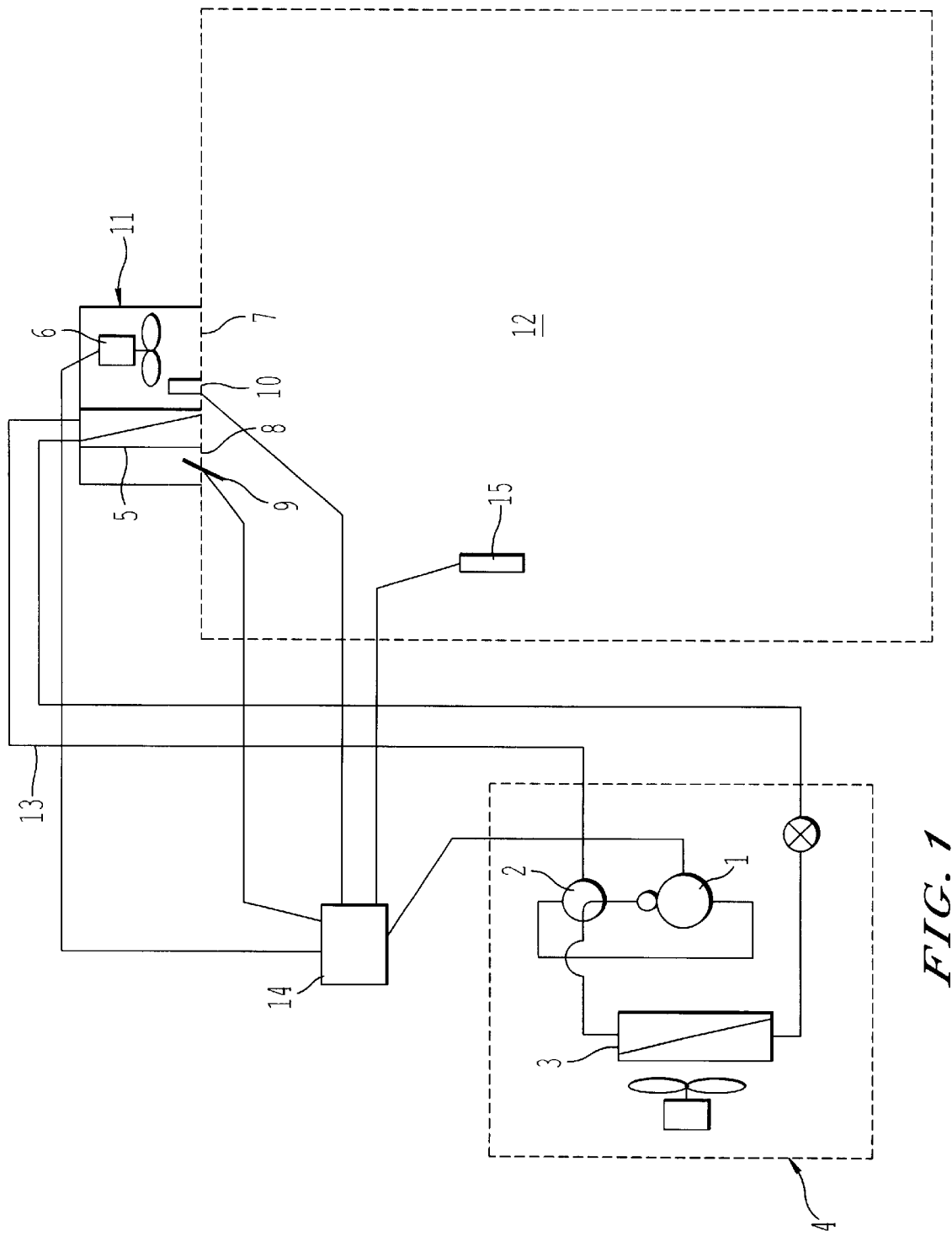
FIG. 1 is a view illustrating the configuration of an air conditioner according to a first embodiment of the present invention.
Figure 2:
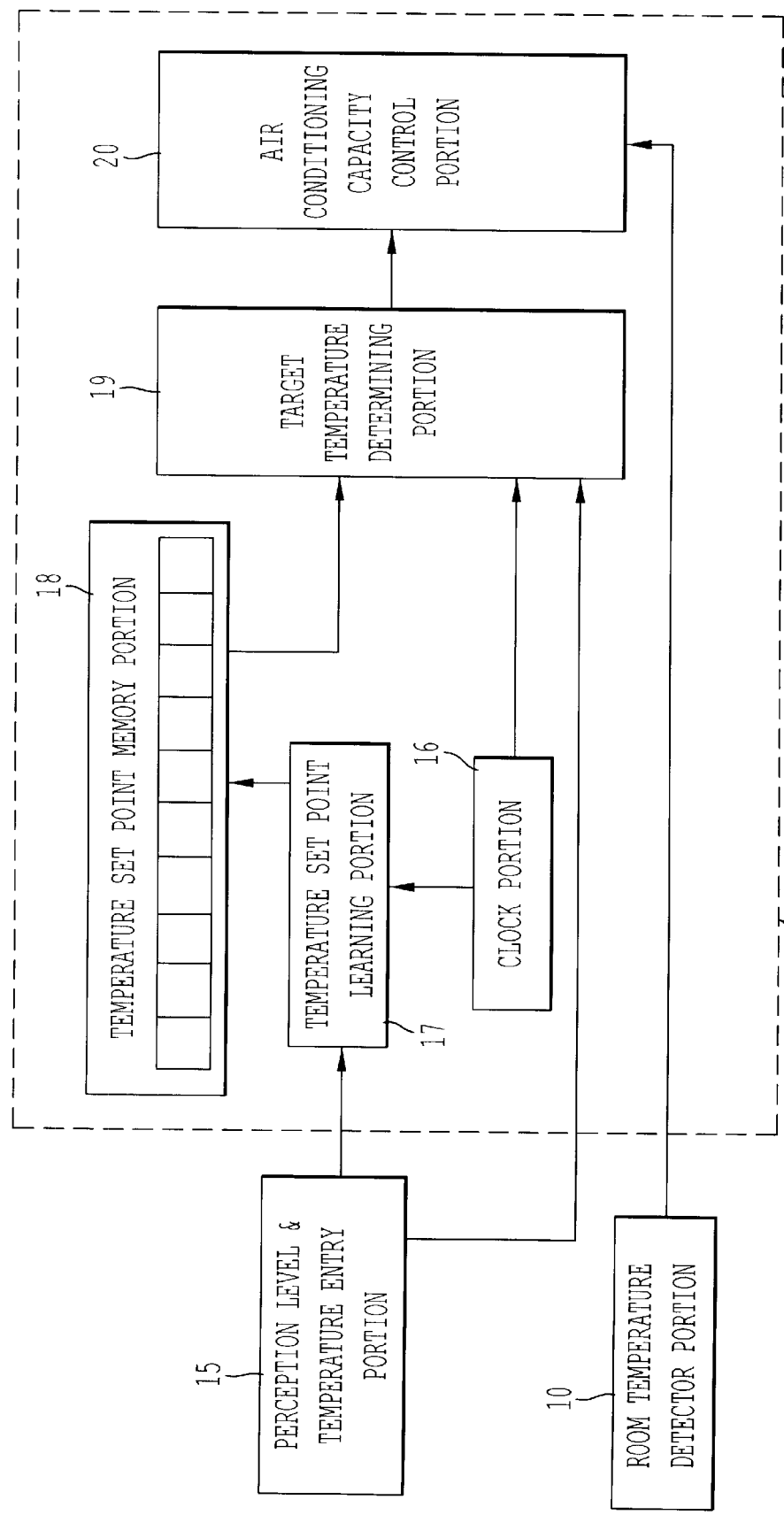
FIG. 2 is a control block diagram of the air conditioner according to the first embodiment of the present invention.
Figure 3:
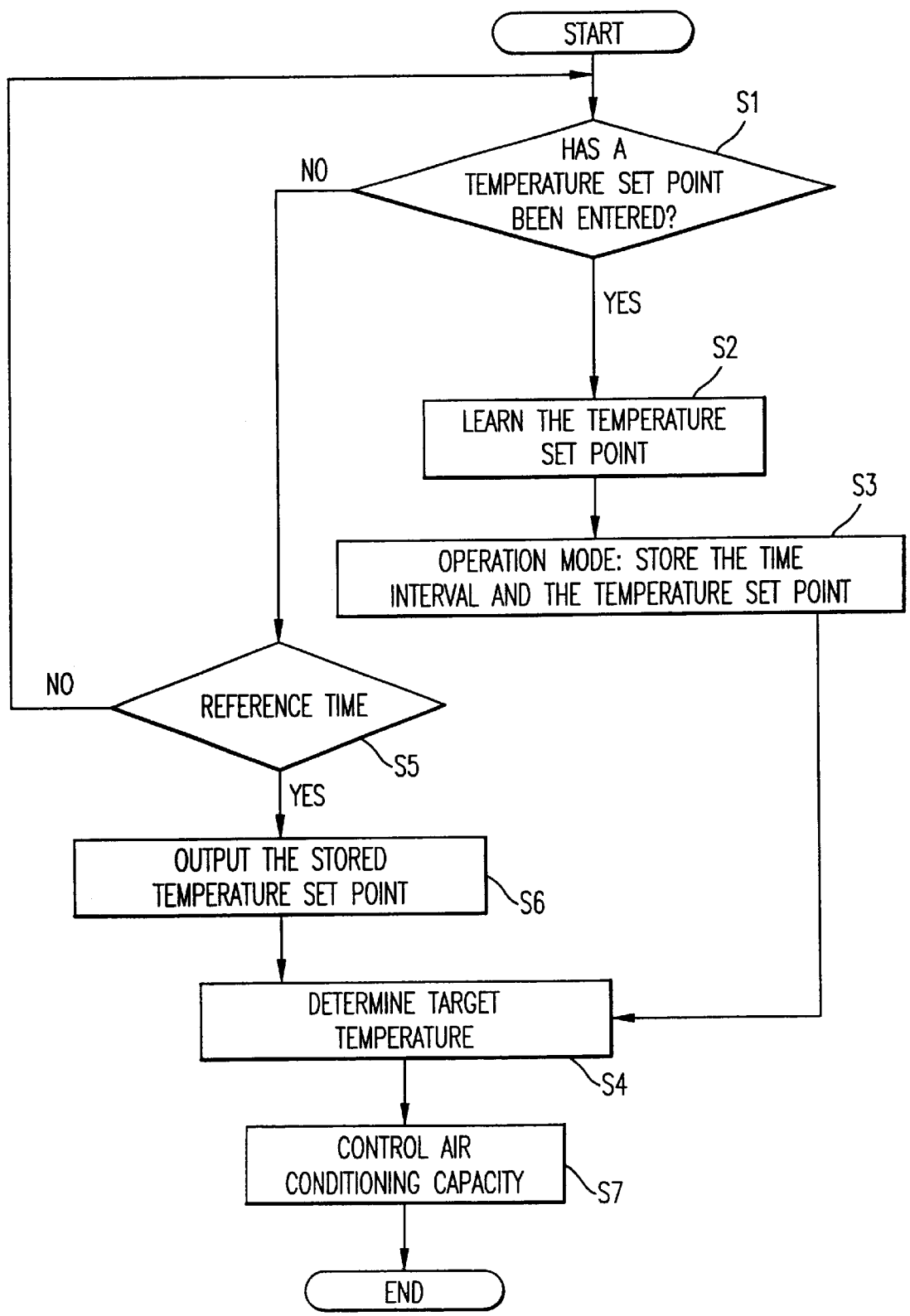
FIG. 3 is a control flow diagram of the air conditioner according to the first embodiment of the present invention.

FIG. 1 is a view illustrating the configuration of the air conditioner according to the first embodiment of the present invention. FIG. 2 is a control block diagram of the air conditioner. FIG. 3 is a control flow diagram of the air conditioner according to the first embodiment of the present invention.

Referring to FIGS. 1 and 2, reference numeral 1 designates a compressor driven by a constant frequency or variable frequencies, reference numeral 2 designates a four-way valve for changing the direction of flow of a refrigerant between cooling and heating operations, and reference numeral 3 designates an outdoor heat exchanger. The compressor 1, the four-way valve 2, and the heat exchanger 3 mainly constitute an outdoor unit 4.

On the other hand, reference numeral 5 designates an indoor heat exchanger; reference numeral 6 designates an air blower for circulating air in the room; and reference numeral 7 designates an air intake port 7, through which air is drawn from the room into the air blower 6. Reference numeral 8 designates an air output port, through which air is blown from the air blower 6 into the room; reference numeral 9 designates louvers, provided on the air output port 8, for changing the direction of the blown air; and reference numeral 10 designates a room temperature detector portion such as a thermistor for measuring the room air temperature. The heat exchanger 5, the air blower 6, the air intake port 7, the air output port 8, the louvers 9, and the room temperature detector portion 10 constitute an indoor unit 11.

The outdoor unit 4 and the indoor unit 11 are coupled to each other by piping 13, constituting a refrigerating cycle as a whole. This makes it possible to cool or warm an air-conditioned room 12 by operating the compressor 1 and switching the four-way valve 2. In addition, the outdoor and indoor units 4, 11 are electrically coupled to a controller 14 to receive and send control signals. Reference numeral 15 designates a perception level & temperature entry portion such as a remote controller, where the user enters operation conditions such as a user's perception level of temperature, a desired temperature, an operation mode such as heating and cooling and the like. The user's entries take the form of signal to be sent to the outdoor and indoor units 4, 11 via the controller 14. This allows the air conditioner to be operated to satisfy the room temperature set point desired by the user. Here, the perception entry means to enter the perception level of temperature felt by the human body such as "hot" or "cold", while the temperature entry means to enter a temperature set point as the temperature desired by the user.

In addition, the room air temperature of the air-conditioned room 12 is detected with the room temperature detector portion 10 provided inside the indoor unit 11 and the signals therefrom are sent to the controller 14. The controller 14 carries out the operation of the air conditioner in accordance with these control signals. More specifically, the air conditioner is operated in accordance with the control signals from the controller 14 to change the rotational speed of the compressor 1, the rotational speed of the indoor air blower 6, and the vane angle φ of the louvers 9.

Now, the controller 14 will be explained with reference to FIG. 2. Reference numeral 16 designates a clock portion, having a timer function, for measuring time and outputting the measured time to a temperature set point learning portion 17 and a target temperature determining portion 19 for determining the target temperature of the air-conditioned room 12. In accordance with the perception or temperature entry from the perception level & temperature entry portion 15 and the time entry from the clock portion 16, the temperature set point learning portion 17 learns the temperature set point entered by the user, the current operation mode, and the time of the day during which the temperature set point have been entered, and then sends an output to a temperature set point memory portion 18. Reference numeral 18 designates the temperature set point memory portion which has a memory for storing a plurality of temperatures and stores a plurality of temperature set points learned by the temperature set point learning portion 17. For example, when a day of 24 hours is divided into one-hour intervals, the temperature set point memory portion 18 memorizes 24 temperature set points for a day, which have been learned for each one-hour interval. In addition, when the air conditioner has a plurality of operation modes such as cooling and heating, the temperature set point memory portion 18 can store 24 temperature set points for each of the operation modes.

In the case of the temperature entry when the user has entered a temperature set point into the perception level & temperature entry portion 15, the target temperature determining portion 19 determines this temperature set point set by the user, as a target temperature. Furthermore, in the case of the perception entry when the user has entered a perception level, for example, "hot" during the cooling cycle of operation, the target temperature determining portion 19 determines a current target temperature—α° C. (where α=0.5, 1.0, 1.5) as the target temperature. On the other hand, to eliminate the inconvenience of setting and improve the comfort level of the user, a day is divided into predetermined intervals and the divided time intervals are stored in the temperature set point memory portion 18. Then, at the time of start of each time interval (hereinafter referred to as a "reference time"), the learned temperature set point for the time interval is determined as the target temperature irrespective of a perception or temperature entry from the perception level & temperature entry portion 15.

Reference numeral 20 is an air conditioning power control portion which mainly changes the rotational speed of the compressor 1 and turns on or off the compressor 1 to adjust the room air temperature to the target temperature in accordance with the target temperature determined by the target temperature determining portion 19 and the room air temperature detected by the room temperature detector portion 10. Furthermore, the air conditioning power control portion 20 can carry out not only power control but also make it possible to change the rotational speed of the compressor 1, the rotational speed of the indoor air blower 6, and the vane angle φ of the louvers 9, as required.

Now, the cooling cycle of operation of the air conditioner, configured as described above, according to the first embodiment will be explained below with reference to FIGS. 1 to 3. Referring to FIGS. 1 to 3, when the user has turned on a power supply switch (not shown) and entered an operation mode and a temperature set point into the perception level & temperature entry portion 15 (if "YES" in step S1), the information is entered into the temperature set point learning portion 17 of the controller 14. The temperature set point learning portion 17 receives the information regarding the current time interval from the clock portion 16 to learn the operation mode and the temperature set point for the time interval (step S2), which are outputted to the temperature set point memory portion 18.

The temperature set point memory portion 18 associates the operation mode, time interval, and the learned temperature set point with each other, which have been entered from the temperature set point learning portion 17, to store them therein (step S3). FIG. 4 shows tables of the temperature set points of one-hour intervals for the cooling cycle of operation, stored in the temperature set point memory portion 18. When a day of 24 hours is divided into one-hour intervals, 24 temperature set points are actually stored in the temperature set point memory portion 18. However, FIG. 4(*a*) shows ten temperature set points stored for the 8-o'clock interval to the 17-o'clock interval.

The temperature set points stored in the temperature set point memory portion 18 are rewritten or changed as follows. During the 13-o'clock interval (a predetermined time interval), the temperature set point for the cooling operation, stored in the temperature set point memory portion 18, is 27° C. as shown in FIG. 4(*a*). However, suppose that the user has entered a temperature set point of 26° C. at 13:20 into the perception level & temperature entry portion 15. In this case, the temperature set point learning portion 17 determines that the temperature set point has been entered during the 13-o'clock interval since the time output from the clock portion 16 tells that the current time is in the 13-o'clock interval. Thus, the temperature set point learning portion 17 learns the user's comfortable temperature during the 13-o'clock interval. The temperature set point learning portion 17 outputs the temperature set point to the temperature set point memory portion 18, and then the temperature set point memory portion 18 changes the contents of the temperature set point stored therein from 27° C. to 26° C. as shown in FIG. 4(*b*) to store the resulting temperature set point. Thus, user's comfortable temperatures are learned from the temperature set points entered by the user, thereby making it possible to serve each life scene.

Furthermore, when the user has entered an operation mode and a temperature set point into the perception level & temperature entry portion 15 (if "YES" in step S1), the target temperature determining portion 19 determines the entered temperature set point as a target temperature to change the room temperature to the temperature desired by the user (step S4). On the other hand, even when no temperature set point is entered by the user into the perception level & temperature entry portion 15 (if "NO" in step S1), the target temperature determining portion 19 determines at all times whether the current time is a preset reference time in accordance with the time output from the clock portion 16 (step S5).

When the current time is a reference time (if "YES" in step S5), the target temperature determining portion 19 reads the temperature set point for the current time interval stored in the temperature set point memory portion 18 and then determines the temperature set point as a target temperature (step S4). The reference time is the start time of each time interval and can be set as one o'clock, two o'clock, 3 o'clock or the like when one-hour intervals are available. Alternatively, the reference time can be set not to the start of each time interval but to a point within each time interval. The air conditioning power control portion 20 changes the rotational speed of and turns on or off the compressor 1 to thereby control the air-conditioning power in order to adjust the room air temperature to the target temperature in accordance with the target temperature determined by the target temperature determining portion 19 and the room air temperature detected by the room temperature detector portion 10 (step S7).

Figure 5:
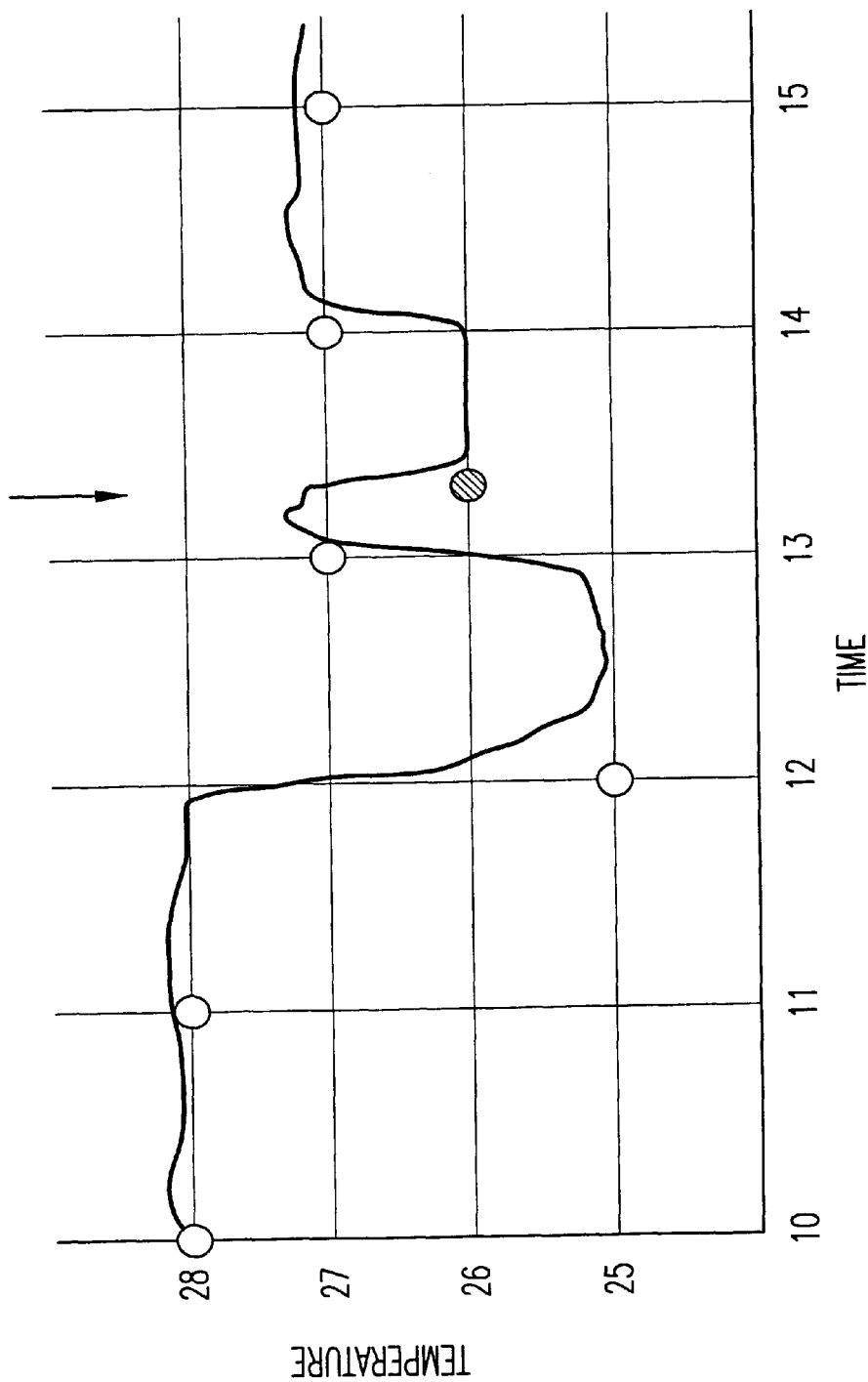
FIG. 5 is a graph showing the change in room air temperature with the passage of time according to the first embodiment of the present invention.

Now, it will be explained below how to control the air-conditioning power and how to change a target temperature (temperature set point). FIG. 5 is a graph showing the change in room air temperature with the passage of time, detected by the room temperature detector portion 10. Referring to FIG. 5, symbol "○" designates the temperature set points stored for each of the time intervals (one-hour intervals) shown in FIG. 4(a), whereas symbol "•" designates the temperature set points entered into the perception level & temperature entry portion 15. In addition, the solid line designates the change in target temperature, while the bold line designates the change in room temperature following the change in target temperature. Here, when no entry is available into the perception level & temperature entry portion 15, employing the temperature set point stored for each time interval as a target temperature, the air-conditioning power is controlled to adjust the room air temperature to the target temperature. On the other hand, when a temperature set point of 26° C. is entered at 13:20 into the perception level & temperature entry portion 15 the stored temperature set point is updated from the former temperature set point 27° C. to the newly entered one 26° C. as shown in FIG. 4(b), and the target temperature is changed to the new temperature set point (of 26° C.) to control air-conditioning power. Thereafter, when it comes to 14:00 of a reference time, the target temperature is changed to the temperature set point (27° C.) for the 14-o'clock interval stored for the cooling cycle of operation to control the air-conditioning power.

As described above, the air conditioner according to the present invention adjusts the room temperature at once by an entry of the temperature set point and further eliminates the user's inconvenience of setting a temperature set point or the like of the air conditioner on an as-needed basis. On the presumption that a life scene during the same time interval of a day remains unchanged, the air conditioner also controls the air conditioning at the same time interval of next and following days to change the target temperature in accordance with the temperature set point entered most recently at the same time interval in a day. This makes it possible to create a comfortable dwelling environment to a variable life.

Furthermore, even when the user has entered a perception level of "hot" once into the perception level & temperature entry portion 15 or a desired temperature set point, a subsequent change in the life scene would presumably vary the perception of the user. However, it is troublesome to frequently change a temperature set point. Therefore, the user allows the temperature set point to remain unchanged in many cases even when the user feels a little colder during a cooling cycle of operation, which is not preferable in terms of energy saving. However, the air conditioner according to the present invention changes automatically the target temperature to the temperature set point learned with reference to the reference time, thereby making it possible to improve the level of energy saving. That is, the air conditioner according to the present invention is characterized mainly by maintaining a comfort level in quick response to the desired temperature set point entered by the user and implementing energy saving as well.

In addition, according to this embodiment, after a temperature set point of 26° C. has been entered into the perception level & temperature entry portion 15, the temperature is changed to the temperature set point at the reference time to control the air-conditioning power. However, to provide comfort at the temperature set point desired by the user, the target temperature determining portion 19 also makes it possible to control the air-conditioning power by allowing the target temperature not to be changed to the temperature set point but to remain unchanged. This may be continued for a predetermined period of time, for example, for thirty minutes, after the temperature set point has been entered into the perception level & temperature entry portion 15 even when the time output from the clock portion 16 is the reference time.

Second Embodiment

Figure 7:
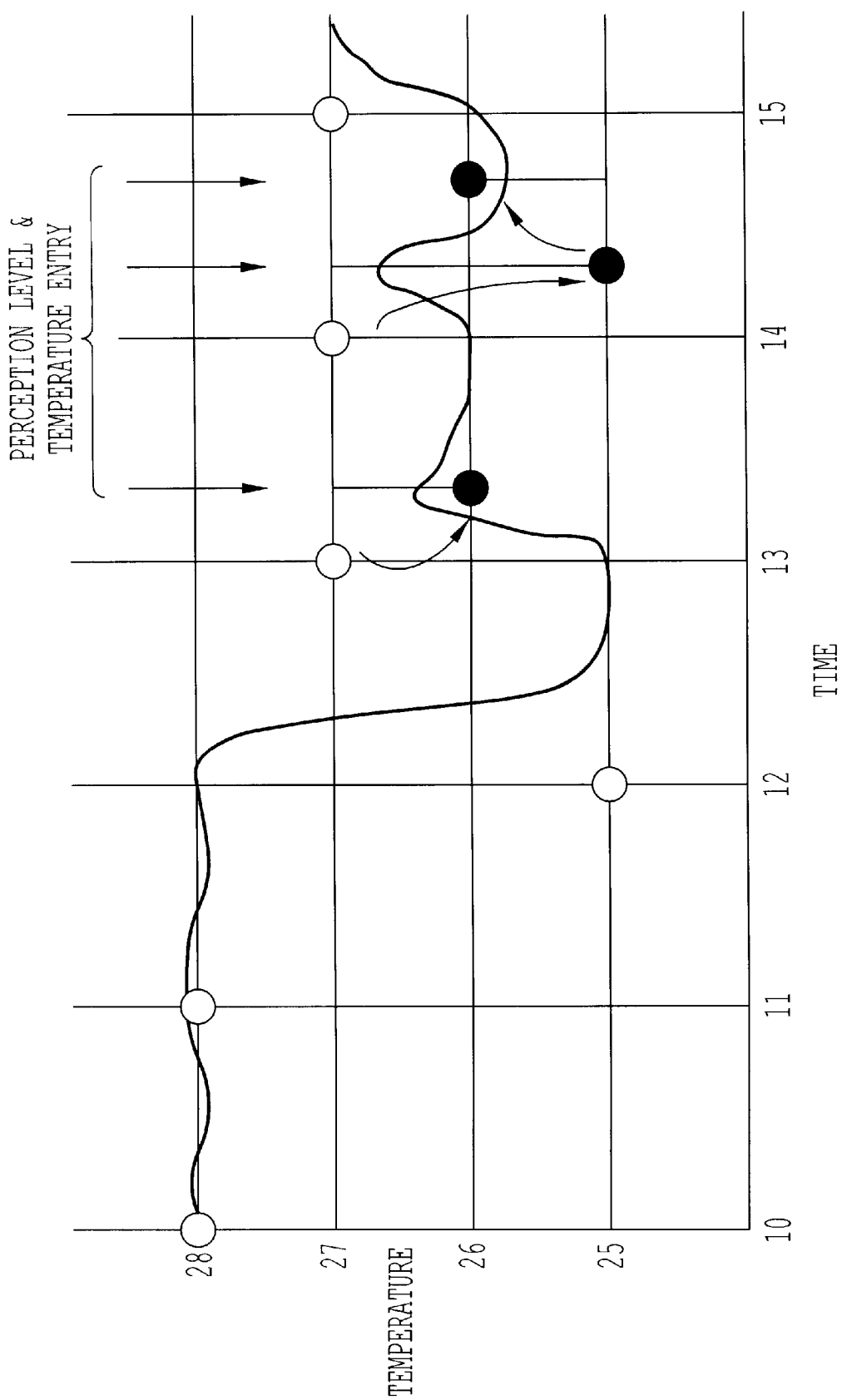
FIG. 7 is a graph showing the change in room air temperature with the passage of time according to the second embodiment of the present invention.

FIG. 6 shows tables of temperature set points, stored in the temperature set point memory portion, for each one-hour interval in a cooling operation mode. FIG. 7 is a graph showing the relationship between the change in room air temperature with the passage of time, detected by the room temperature detector portion 10, and the perception or temperature entry. Referring to FIG. 7, symbol "○" designates the temperature set points for each of the predetermined time intervals (one-hour interval's) shown in FIG. 6(a), whereas symbol "•" designates the temperature set points entered into the perception level & temperature entry portion 15. Incidentally, the principal structure of the air conditioner is the same as that of the first embodiment and therefore is not repeatedly explained. Moreover, the components which are the same as or equivalent to those of the first embodiment are given the same reference numerals and not repeatedly explained. In this embodiment, it is described below how the temperature set point learning portion 17 learns the two or more temperature set points which are entered during one time interval into the perception level & temperature entry portion 15.

When a day of 24 hours is divided into one-hour intervals, the temperature set point memory portion 18 stores actually 24 temperature set points. However, FIG. 6(a) shows ten temperature set points stored for the 8-o'clock interval to the 17-o'clock interval for the cooling operation mode. In the same manner as described in the first embodiment, even when no entry is available into the perception level & temperature entry portion 15, the target temperature determining portion 19 determines whether the time is a reference time, in accordance with the time output from the clock portion 16. Then, the target temperature determining portion 19 determines as the target temperature the temperature set point for each one-hour interval stored in the temperature set point memory portion 18.

Therefore, as shown in FIG. 7, the air-conditioning power is controlled so that the room air temperature detected by the room temperature detector portion 10 is adjusted to the temperature set point of the time interval. Here, when a temperature set point is entered into the perception level & temperature entry portion 15, the target temperature determining portion 19 changes the target temperature to the temperature set point to control the air-conditioning power. Thereafter, the target temperature determining portion 19 changes the target temperature at the reference time to the temperature set point for a predetermined point of time to control the air-conditioning power.

Here, as the 13-o'clock interval shown in FIG. 7, when a perception level or temperature is entered once in one hour, the temperature set point learning portion 17 receives information regarding the current time interval from the time output of the clock portion 16. Then, the temperature set point learning portion 17 learns the operation mode and temperature set point for the time interval and then outputs the resulting data to the temperature set point memory portion 18. On the other hand, during an interval such as the 14-o'clock interval where the perception level or temperature is entered twice or more in one hour, the temperature set point learning portion 17 takes energy saving into consideration. Thus, in a cooling cycle of operation, the temperature set point learning portion 17 learns that a comfortable temperature is an arbitrary temperature between the maximum and an average temperature of the entered temperature set points, and then outputs the resulting data to the temperature set point memory portion 18. On the other hand, in a heating cycle of operation, the temperature set point learning portion 17 learns that a comfortable temperature is an arbitrary temperature between the minimum and an average temperature of the entered temperature set points, and then outputs the resulting data to the temperature set point memory portion 18. However, to enhance energy saving, the temperature set point learning portion 17 can output the maximum temperature of the entered temperature set points to the temperature set point memory portion 18 during a cooling cycle of operation, whereas outputting the minimum temperature of the entered temperature set points to the temperature set point memory portion 18 during a heating cycle of operation.

That is, when two temperature set points of 25° C. and 26° C. have been entered by the user as in the 14-o'clock interval, the temperature set point learning portion 17 learns a higher temperature set point or 26° C., which is in turn outputted to the temperature set point memory portion 18. The temperature set point memory portion 18 changes and then memorizes the stored contents of the temperature set point of the 14-o'clock interval as shown in FIG. 6(b). Since learning is carried out in accordance with the temperature set point provided by the user even when a temperature set point is adapted to be learned as described above, energy saving can be improved without affecting the comfort level of the user. In addition, in the same manner as in the first embodiment, the temperature set point may also be memorized in accordance with the recent entry of the user.

Third Embodiment

Figure 8:
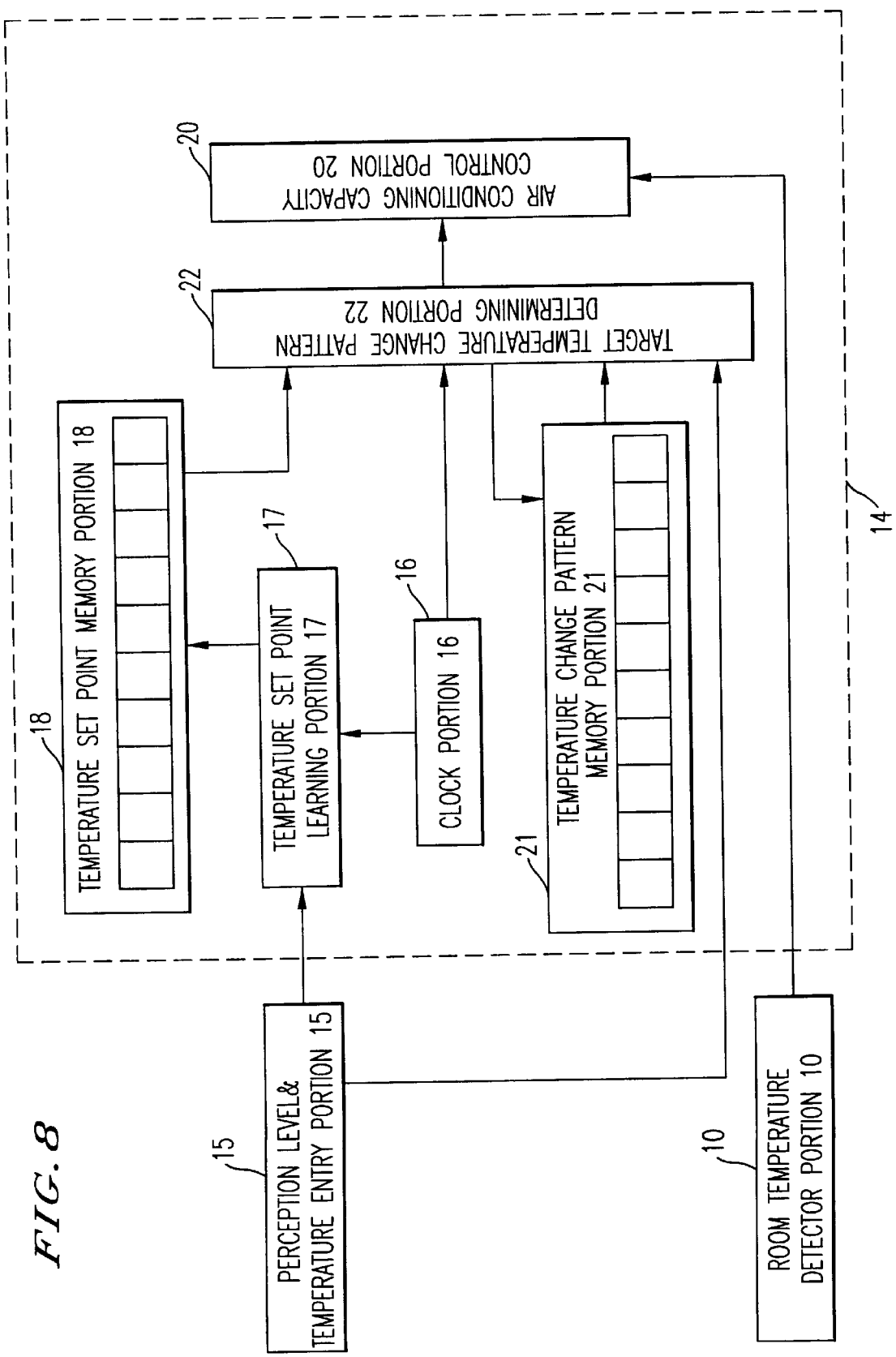
FIG. 8 is a control block diagram of an air conditioner according to a third embodiment of the present invention.
Figure 9:
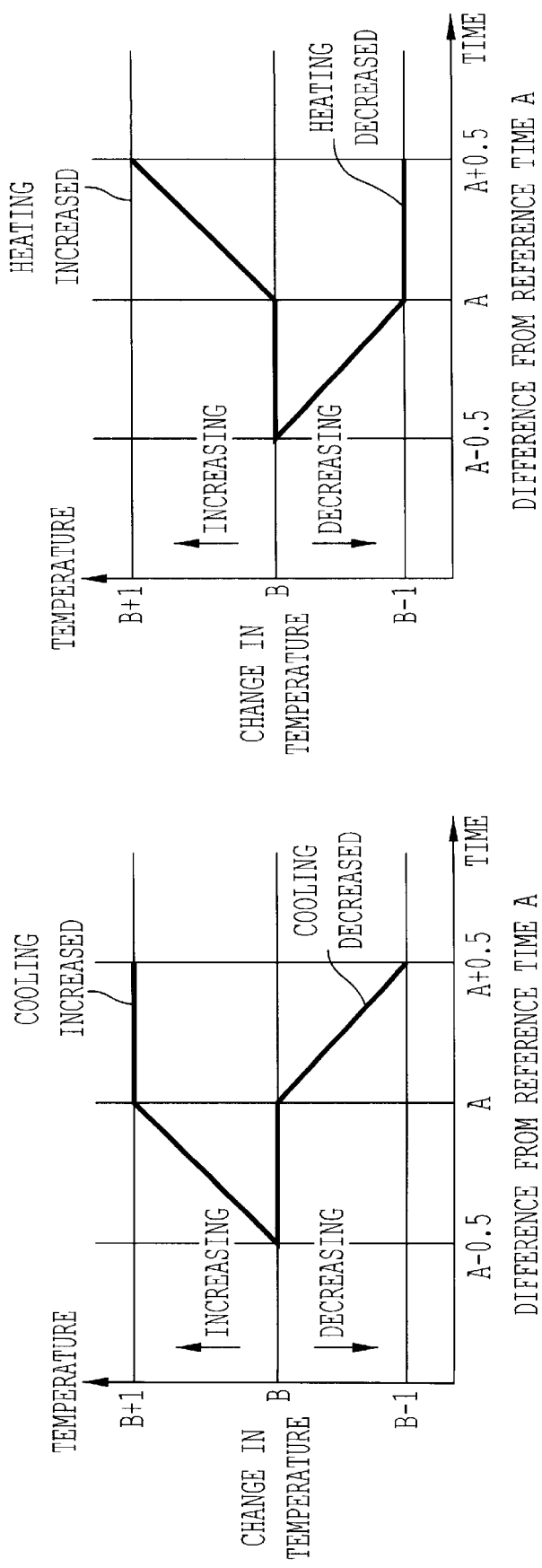
FIG. 9 shows graphs illustrating patterns of the change in temperature of the air conditioner according to the third embodiment of the present invention.

FIG. 8 is a control block diagram of an air conditioner according to the third embodiment of the present invention. FIG. 9 shows graphs illustrating patterns of the change in temperature to a target temperature against the reference time. Incidentally, the principal structure of the air conditioner is the same as that of the first embodiment and therefore is not repeatedly explained. Moreover, the components which are the same as or equivalent to those of the first embodiment are given the same reference numerals and not repeatedly explained. In the first embodiment, the method for determining a target temperature differently at different times to a life scene has been explained. In this embodiment, described below is how to control the patterns for changing the room air temperature to a target temperature.

Referring to FIG. 8, reference numeral 21 designates a temperature change pattern memory portion for storing a plurality of temperature change patterns. A plurality of temperature change patterns are stored for each operation mode such as a cooling or heating cycle of operation. Reference numeral 22 designates a target temperature change pattern determining portion for determining the target temperature and the temperature change patterns of room air. When a perception level & temperature is entered on the perception level & temperature entry portion 15, the target temperature change pattern determining portion 22 determines as a target temperature the temperature set point in the operation mode. On the other hand, even when no perception level & temperature is entered on the perception level & temperature entry portion 15, the target temperature change pattern determining portion 22 determines as a target temperature the temperature set point of the time interval stored in the temperature set point memory portion 18 at the reference time.

After the target temperature has been determined, the target temperature change pattern determining portion 22 determines the change pattern to reach the target temperature. That is, since the entry of a perception level & temperature on the perception level & temperature entry portion 15 would show that the user desires the temperature to be changed, it is necessary to respond to the requirement of the user by changing the temperature to the target temperature as soon as possible after the entry of the perception level & temperature. On the other hand, when the temperature set point in the time interval stored in the temperature set point memory portion 18 is determined as a target temperature, the temperature is not the one entered by the user and therefore the air conditioning is controlled taking as much consideration of energy saving as possible.

In the first embodiment, when temperature set points are stored for each one-hour interval in the temperature set point memory portion 18, the air-conditioning capacity is controlled to change the target temperature to the temperature set point at the reference time or the start time of the one-hour interval. However, this embodiment provides a plurality of temperature change patterns for reaching the target temperature. The target temperature change pattern determining portion 22 determines one of the plurality of change patterns. Then, the compressor 1 is controlled to change the rotational speed and turned on or off to bring the target temperature to the room air temperature in accordance with the determined temperature change patterns.

The temperature change patterns and a method for determining a temperature change pattern will be described below. As shown in FIG. 9(a), when the operation pattern is a cooling cycle of operation where the cooling temperature is increased with the temperature set point of the subsequent time interval being higher than temperature set point of the current time interval, the target temperature is changed as soon as possible to the temperature set point of the subsequent time interval at the reference time to control the air conditioning. On the other hand, to decrease the cooling temperature with the temperature set point of the subsequent time interval being lower than temperature set point of the current time interval, the target temperature is changed to the temperature set point at the reference time to control the air conditioning. This makes it possible to maintain as high a temperature as possible during the cooling cycle of operation, thereby providing a healthy and comfortable dwelling environment with the air-conditioning load being reduced and without making the user feel overcooled.

In addition, as shown in FIG. 9(b), contrary to the cooling cycle of operation, when the operation pattern is a heating cycle of operation where the heating temperature is increased with the temperature set point of the subsequent time interval being higher than temperature set point of the current time interval, the target temperature is changed at the reference time to control the air conditioning. On the other hand, to decrease the heating temperature with the temperature set point of the subsequent time interval being lower than temperature set point of the current time interval, the target temperature is changed as soon as possible to the temperature set point of the subsequent time interval at the reference time to control the air conditioning. This makes it possible to maintain as low a temperature as possible during the heating cycle of operation, thereby reducing the air-conditioning load.

As described above, air conditioning is carried out in accordance with the learned temperature set point. Moreover, not with one type of temperature change pattern but with a plurality of temperature change patterns, a temperature change pattern which provides better energy saving among the plurality of temperature change patterns is selectively determined according to the circumstances. This makes it possible to reduce the total load of the air conditioner during the cooling and heating cycles of operation and implement operation control with improved energy saving without affecting the comfort level of the user.

Figure 10:
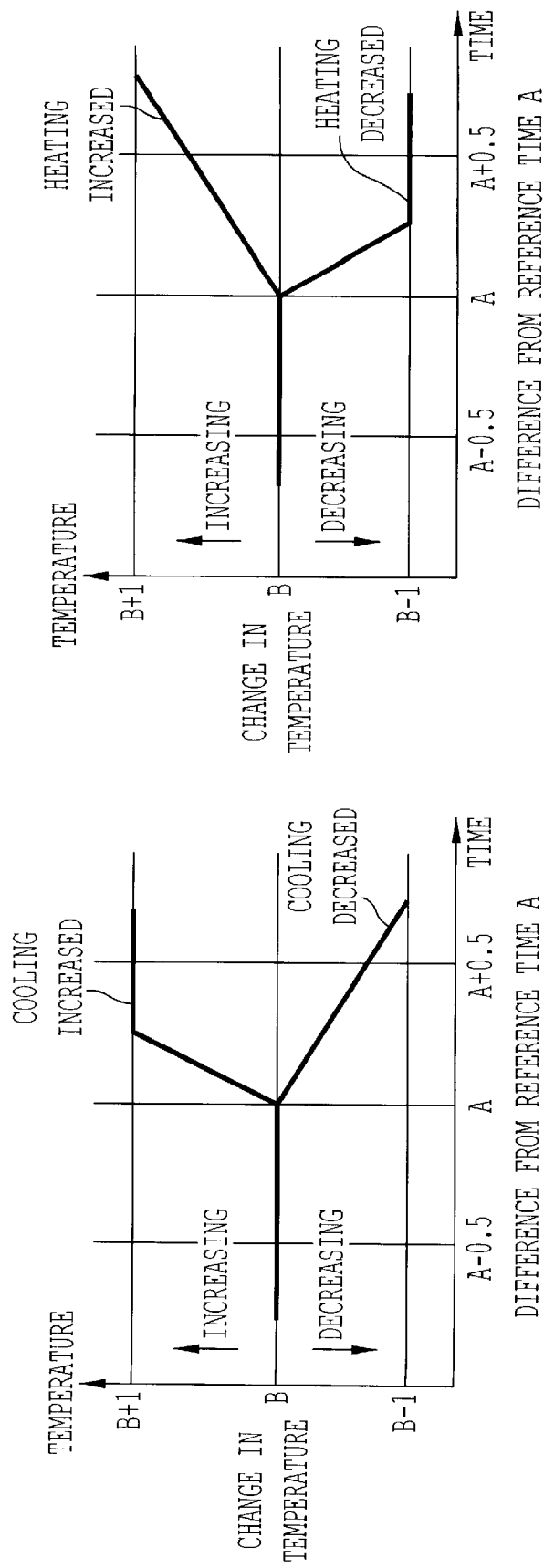
FIG. 10 shows graphs illustrating patterns of the change in temperature of the air conditioner according to the third embodiment of the present invention.

In addition, another example of temperature change patterns is shown in FIG. 10. As shown in FIG. 10(a), when operation pattern is a cooling cycle of operation where a cooling temperature is increased with the temperature set point of the subsequent time interval being higher than the temperature set point of the current time interval, the target temperature is shifted quickly from the reference time to control air conditioning. On the other hand, in a case where a cooling temperature is decreased with the temperature set point of the subsequent time interval being lower than the temperature set point of the current time interval, the target temperature is shifted slowly from the reference time to control air conditioning.

In addition, as shown in FIG. 10(b), contrary to the cooling cycle of operation, when the operation pattern is a heating cycle of operation where a heating temperature is increased with the temperature set point of the subsequent time interval being higher than the temperature set point of the current time interval, the target temperature is shifted slowly from the reference time to control air conditioning. On the other hand, in a case where a heating temperature is decreased with the temperature set point of the subsequent time interval being lower than the temperature set point of the current time interval, the air conditioning is carried out so that the target temperature is changed as soon as possible from the reference time to reach the temperature set point quickly and thereby provide a shift in temperature. As described above, by providing for several types of gradients of target temperature change patterns, it is made possible to reduce the total load of the air conditioner during the cooling and heating cycles of operation and implement operation control with improved energy saving.

Figure 11:
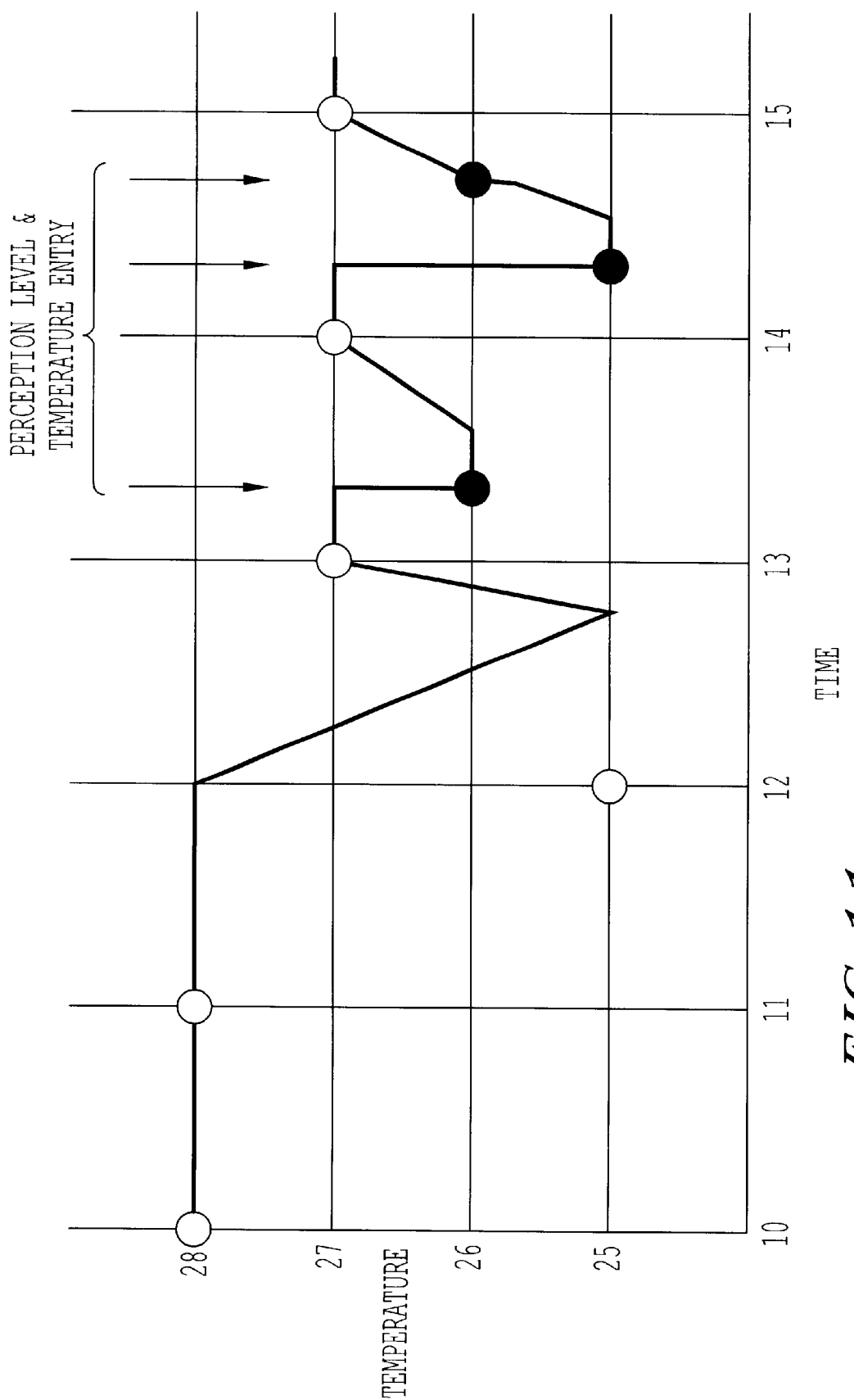
FIG. 11 is a graph showing the change in room air temperature with the passage of time according to the third embodiment of the present invention.

Furthermore, it is also possible to provide a difference in the times for changing the temperature to a target temperature and in the gradients of target temperature change patterns. In these cases, it is possible to reduce the total load of the air conditioner during the cooling and heating cycles of operation. FIG. 11 is a graph showing the change in room air temperature with the passage of time, provided when such operation control is carried out. Referring to FIG. 11, at 12 o'clock, the target temperature is changed to 25° C. or the temperature set point of the 12-o'clock interval to provide a slow temperature shift. On the other hand, at 13 o'clock, it is more advantageous to energy saving to shift the room temperature to 27° C. or the temperature set point of the 13-o'clock interval and therefore the target temperature is changed in good time in the 12-o'clock interval to control air conditioning. Moreover, when a perception level & temperature is entered on the perception level & temperature entry portion 15 as in the 13- and 14-o'clock intervals, the target temperature is changed to temperature set point at once.

Fourth Embodiment

Figure 12:
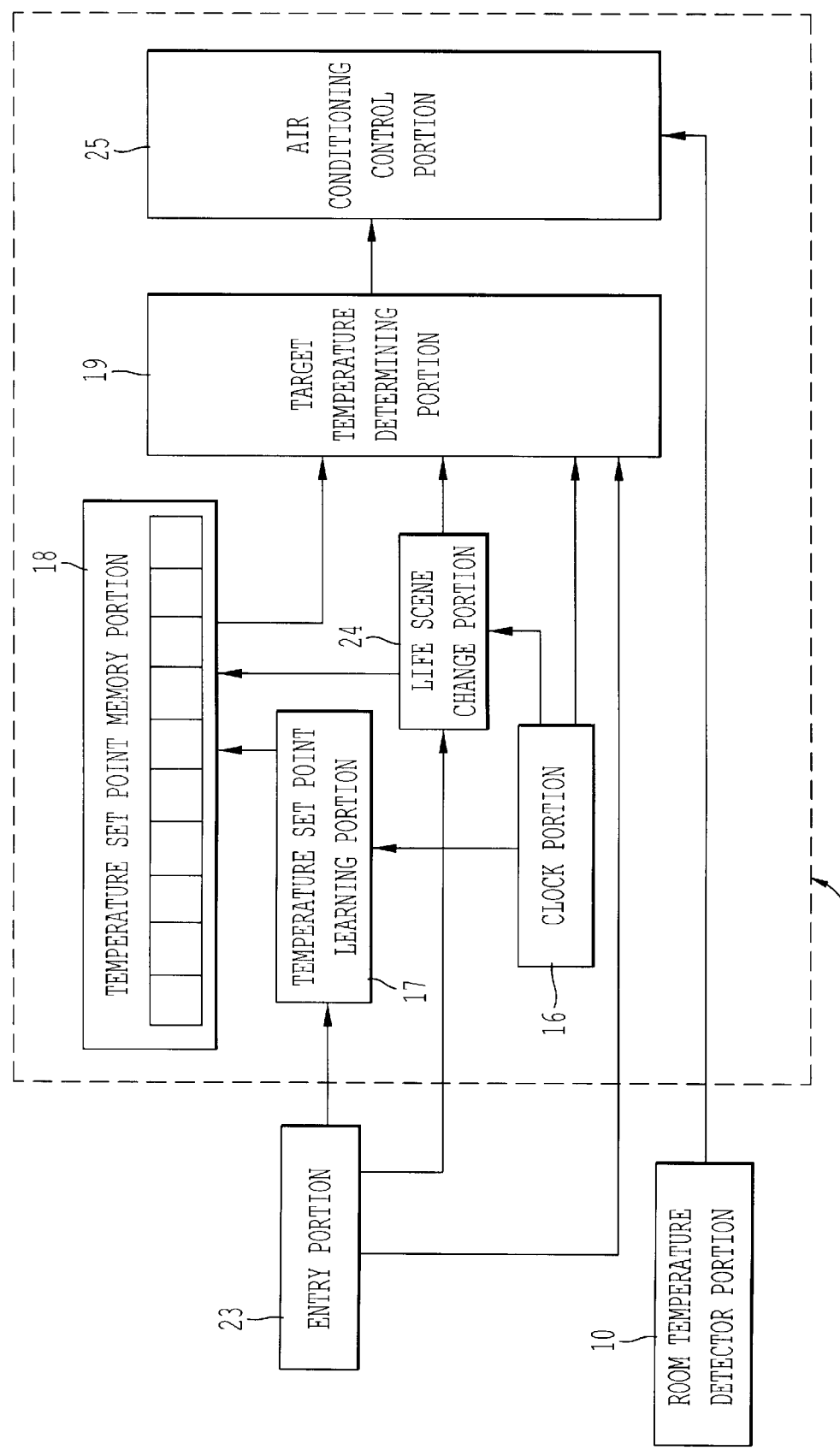
FIG. 12 is a control block diagram of an air conditioner according to a fourth embodiment of the present invention.
Figure 13:
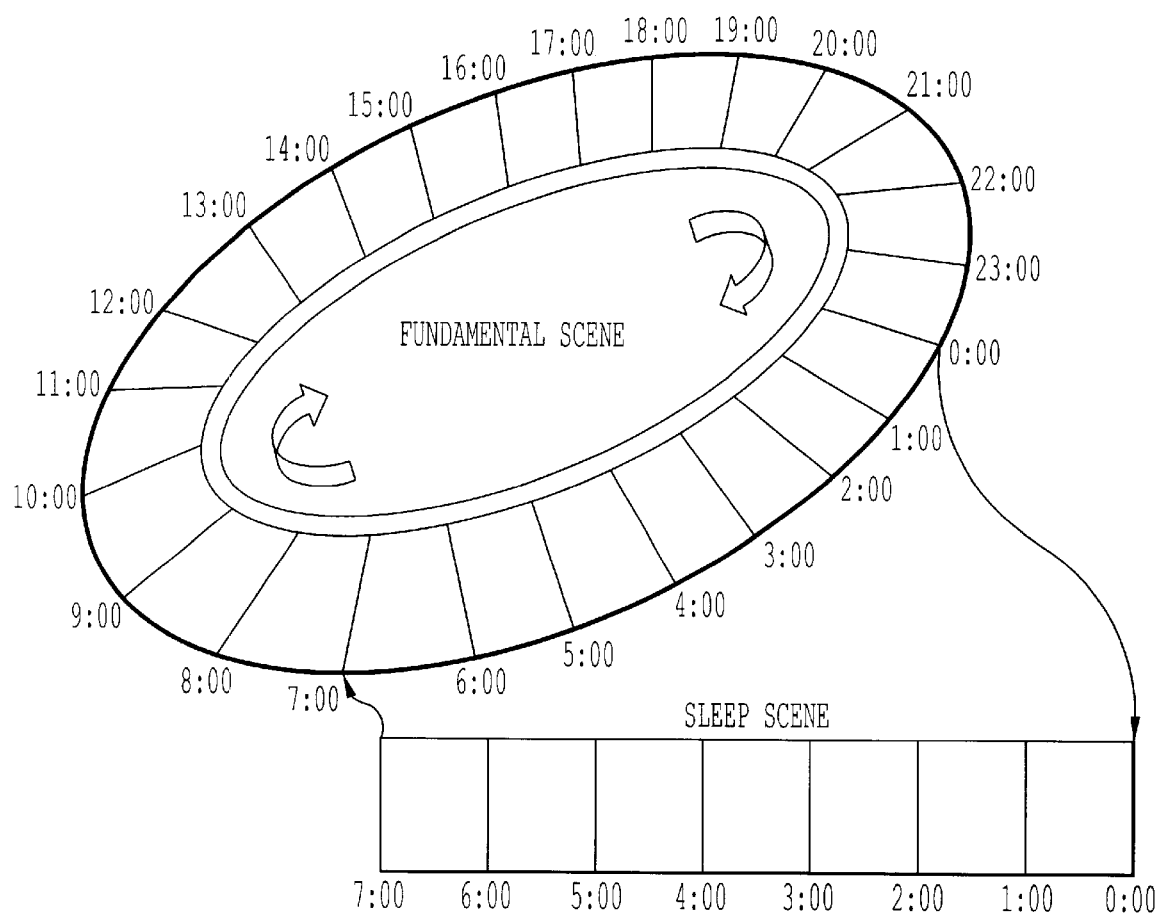
FIG. 13 is a view illustrating the image of the contents stored in the temperature set point memory portion according to the fourth embodiment of the present invention.
Figure 14:
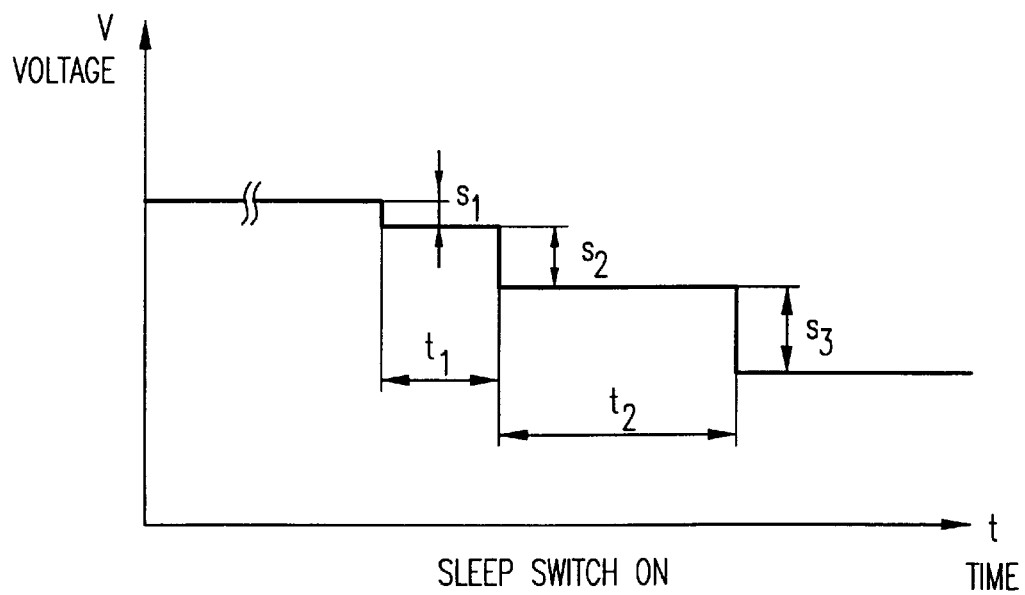
FIG. 14 is a timing chart illustrating the voltage corresponding to shift temperatures of a conventional air conditioner.
Figure 15:
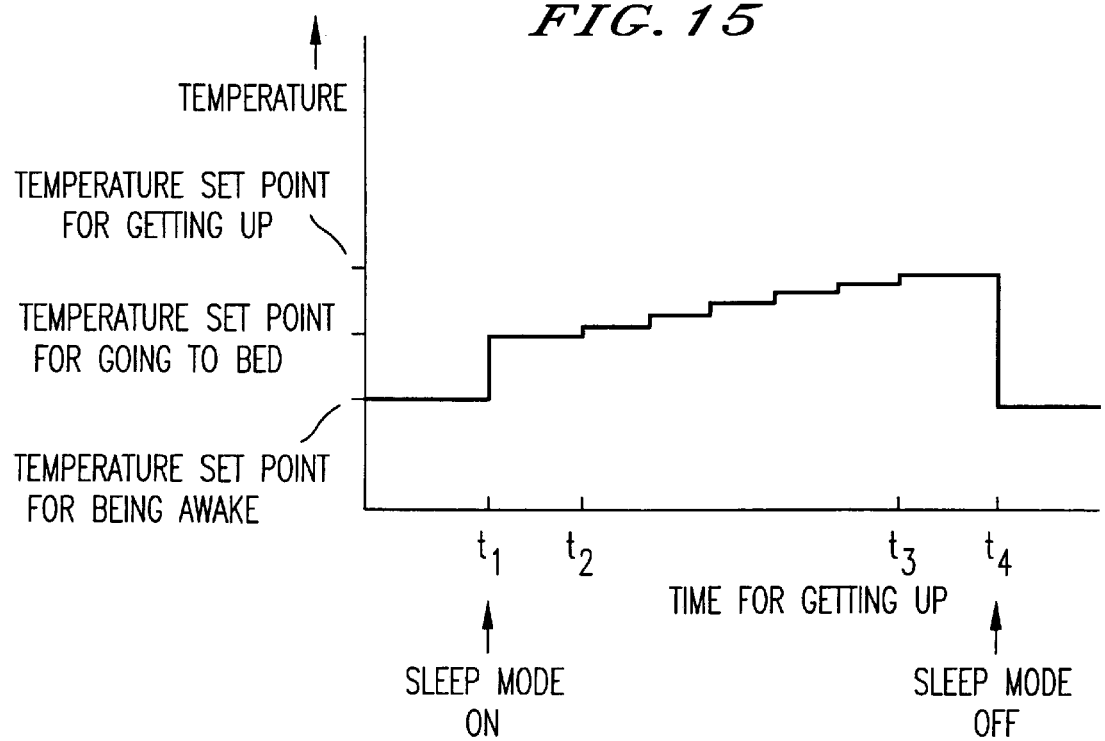
FIG. 15 is a timing chart illustrating the shift in temperature of a conventional air conditioner.

FIG. 12 is a control block diagram of an air conditioner according to a fourth embodiment of the present invention. FIG. 13 is a view illustrating the image of the contents stored in the temperature set point memory portion. Incidentally, the principal configuration of the air conditioner is the same as that of the first embodiment and is not repeatedly explained. In addition, the components which are the same as or equivalent to those of the first embodiment are given the same reference numerals and are not explained repeatedly.

The environment where a person feels comfortable varies depending on the behavior and life scene of the person. To provide accordingly a comfortable environment at all times, in the first to third embodiments, a target temperature is determined to be the temperature set point learned for each predetermined time interval to carry out air conditioning, thereby creating a dwelling environment suitable for a variable life. On the other hand, of the life scenes of a person, it is possible to interpret fundamental life scenes as one framework. For example, the framework can include fundamental life scenes such as sleeping, going-out, staying at home or the like, and there exists air conditioning suitable for each life scene.

For example, the level of activity is significantly lowered and the amount of clothes is replaced by bedding during a life scene of sleeping, thus providing human factors different from such as those during the time of being awake staying at home. Therefore, it can be obviously said that a different fundamental dwelling environment is provided. In this embodiment, an explanation is given to the case where of the life scenes of a person, fundamental life scenes are interpreted as a framework to carry out air conditioning suitable for each scene.

Referring to FIG. 12, reference numeral 23 designates an entry portion having perception level & temperature entry means, entry means for entering operation modes, and entry means corresponding to each life scene such as "sleep mode" or "go-out mode". Reference numeral 24 designates a life scene change portion for changing each fundamental life scene of the user. Here, the "life scene" means, for example, a scene of sleeping, going-out, or staying at home, which are organized in a predetermined framework. Reference numeral 25 designates an air conditioning control portion for changing the rotational speed of the compressor 1, the rotational speed of the indoor air blower 6, and the vane angle $\phi$ of the louvers 9 whenever necessary in accordance with the target temperature of each life scene of the target temperature determining portion 19 and the room temperature detected by the room temperature detector portion 10.

Furthermore, in this embodiment, an explanation is given below to the case, which is interpreted as a "fundamental scene", where air conditioning is carried out with the temperature set point stored in the temperature set point memory portion, described in the first to third embodiments, being determined as a target temperature.

With reference to FIG. 13, an example of changing a life scene will be explained below. As explained in the first embodiment, the example is normally a fundamental scene where air conditioning is carried out with the temperature set point of each one-hour interval being employed as a target temperature. However, when the user has entered the "sleep mode" on the entry portion 23, the life scene is changed by the life scene change portion 24 to the sleep scene which stores temperature set points unique to the sleep scene, thereby carrying out air conditioning suitable for each life scene.

On the other hand, the temperature set point memory portion 18 has stored temperature set points unique to each life scene with temperature set points of the sleep scene being stored for each predetermined time interval. The predetermined time interval can be set corresponding to each life scene. For example, the sleep scene may be divided into three time intervals of going to bed, sleeping, and getting up, for each of which a temperature set point is stored. Alternatively, the sleep scene may be divided into more time intervals. Therefore, an output of a change in scene to the sleep scene, provided from the life scene change portion 24, would cause the temperature set point memory portion 18 to output the temperature set point learned unique to the sleep scene for the current time interval to the target temperature determining portion 19 via the life scene change portion 24 in accordance with the time output from the clock portion 16.

Here, the target temperature determining portion 19 determines the temperature set point as a target temperature. Then, the air conditioning control portion 25 first changes the rotational speed of the compressor 1 and turns on or off the compressor 1 in accordance with the target temperature and the room air temperature detected by the room temperature detector portion 10. In addition, to cope appropriately with a unique life scene or the sleep scene, the rotational speed of the indoor air blower 6 is minimized to reduce an adverse effect on the sleeping due to the noise of the air conditioner (the noise of the indoor air blower) given off during sleeping. On the other hand, to satisfy the requirement of the energy saving operation, the rotational speed of the indoor air blower 6 is gradually increased when an accumulated difference between the temperature of the indoor heat exchanger 5 and the room air temperature has been found greater than a predetermined amount. In addition, thereafter, the rotational speed of the indoor air blower 6 is again minimized in consideration of an adverse effect on the sleeping due to the noise. In the sleep scene, it is also possible to change the vane angle φ of the louvers 9 to prevent air from being blown directly to the sleeping user in order not to allow the user to feel overcooled.

Moreover, in the sleep scene, the target temperature determining portion 19 can be designed to employ as a target temperature the temperature set point of the time at which the user has entered the "sleep mode" on the entry portion 23 during a given period of time (e.g., 1 to 2 hours) until sleep is entered, and then change the temperature set point of the sleep scene to the target temperature after the given period of time.

More specifically, as shown in FIG. 13, when the user goes to bed at 0:00 midnight and enters the "sleep mode" on the entry portion 23, the reading of the contents stored in the temperature set point memory portion 18 is shifted from the fundamental scene to the sleep scene and thus air conditioning is carried out corresponding to the sleep scene from 0:00. On the other hand, when the time for getting up has been set to 7 o'clock upon entry of the "sleep mode", the sleep scene is shifted to a fundamental life scene at 7 o'clock. During the sleep scene, temperature is controlled corresponding to the sleep scene as described above. It is also possible to allow the sleep scene to continue until it is released and then be shifted to the fundamental life scene when the sleep mode is released.

Thus, this makes it possible to carry out air conditioning suitable for each life scene by organizing fundamental life scenes in a predetermined framework and provide improved energy saving in the same manner as explained in the first embodiment.

Incidentally, this embodiment has also a plurality of temperature change patterns as explained in the third embodiment and makes it also possible to select a change pattern corresponding to each life scene to thereby improve the level of comfort and energy saving.

Each of the embodiments has been explained above individually, however, the aforementioned embodiments can be combined with each other as appropriate.

What is claimed is:

1. An air conditioner, comprising:

an entry portion for allowing a user of the air conditioner to enter a temperature set point, using a perception level of temperature or a degree of temperature;

a clock portion for measuring time;

a temperature set point memory portion for storing the temperature set point for each predetermined time interval in accordance with an entry time to said entry portion; and at least operating patterns of heating and cooling cycles, wherein air conditioning power thereof is controlled in accordance with an entry to said entry portion or a temperature stored in the temperature set point memory portion, wherein said temperature set point memory portion stores a temperature for each predetermined time interval for each of said at least operating patterns, and wherein when a user has entered a temperature set point twice or more using said entry portion during a predetermined time interval, a temperature equal to or greater than a mean temperature and equal to or less than the maximum temperature of the entered temperature set points is stored in the temperature set point memory portion in the case of a cooling cycle operation, and whereas a temperature equal to or greater than the minimum temperature and equal to or less than a mean temperature of the entered temperature set points is stored in the temperature set point memory portion in the case of a heating cycle operation.

2. An air conditioner, comprising:

an entry portion for allowing a user of the air conditioner to enter a temperature set point, using a perception level of temperature or a degree of temperature;

a clock portion for measuring time;

a temperature set point memory portion for storing the temperature set point for each predetermined time interval in accordance with an entry time to said entry portion; and a temperature change pattern memory portion for storing a plurality of temperature change patterns, wherein one of the temperature change patterns stored in the temperature change pattern memory portion is selected and determined, thereby controlling air conditioning power in accordance with a temperature stored in the temperature set point memory portion and the determined temperature change pattern, wherein from the plurality of temperature change patterns stored in said temperature change pattern memory portion, different temperature change patterns are selected to increase a cooling temperature and to decrease a cooling temperature during a cooling cycle operation, whereas different temperature change patterns are selected to increase a heating temperature and to decrease a heating temperature during a heating cycle operation, and wherein by said different temperature change patterns, the cooling temperature is more slowly shifted at a time of decreasing the cooling temperature than at a time of increasing the cooling temperature during a cooling cycle operation, while the heating temperature is shifted more slowly at a time of increasing the heating temperature than at a time of decreasing the heating temperature during a heating cycle operation.

3. An air conditioner, comprising:

an entry portion for allowing a user of the air conditioner to enter an operation pattern, a temperature set point, and a life scene;

a clock portion for measuring time;

a temperature set point memory portion for storing a temperature set point for each predetermined time interval of each life scene in accordance with an entry time to said entry portion; and a life scene change portion for outputting, in accordance with a life scene entry to said entry portion, an instruction to change the life scene to said temperature set point memory portion, wherein air conditioning is controlled in accordance with a temperature set point entry to said entry portion or a temperature stored in the temperature set point memory portion, for each life scene, and wherein said life scene includes at least a sleep scene, and when a life scene is changed to said sleep scene, air conditioning is performed by reducing a rotational speed of an indoor air blower.

4. A method for controlling an air conditioner, comprising the steps of:

allowing a user to enter an operation condition for a plurality of predetermined time intervals for at least operating patterns of heating and cooling cycles;

storing the operation condition for each predetermined time interval;

allowing the user to enter a perception level of temperature; and controlling air conditioning power in each time interval in accordance with the operation condition stored for each time interval and the perception level entered by the user, wherein when a user has entered a perception level of temperature or a temperature set point twice or more during a predetermined time interval, a temperature equal to or greater than a mean temperature and equal to or less than the maximum temperature of the entered temperature set points is stored in the temperature set point memory portion in the case of a cooling cycle operation, and whereas a temperature equal to or greater than the minimum temperature and equal to or less than a mean temperature of the entered temperature set points is stored in the temperature set point memory portion in the case of a heating cycle operation.

5. A method for controlling an air conditioner, comprising the steps of:

allowing a user to enter a temperature set point and a life scene entry;

determining in which time interval of a plurality of predetermined time intervals in a day is a current time;

storing a temperature set point of an individual time interval by associating the entry of said temperature set point with said current time interval;

controlling air conditioning power of the same time interval of next and following days in accordance with the temperature set point of the individual time interval, wherein air conditioning is controlled in accordance with a temperature set point entry or a stored temperature set point for each life scene, and wherein said life scene includes at least a sleep scene, and when a life scene is changed to said sleep scene, air conditioning is performed by reducing a rotational speed of an indoor air blower.

6. A method for controlling an air conditioner, comprising the steps of:

allowing a user to enter a temperature set point and a perception level of temperature;

determining in which time interval of a plurality of predetermined time intervals in a day is a current time;

storing a temperature set point of an individual time interval by associating the entry of said temperature set point with said current time interval;

when changing a room air temperature to the stored temperature set point of the individual time interval, determining selectively one of a plurality of temperature change patterns; and controlling air conditioning power in accordance with the determined temperature change pattern, wherein from the plurality of temperature change patterns, different temperature change patterns are selected to increase a cooling temperature and to decrease a cooling temperature during a cooling cycle operation, whereas different temperature change patterns are selected to increase a heating temperature and to decrease a heating temperature during a heating cycle operation, and wherein by said different temperature change patterns, the cooling temperature is more slowly shifted at a time of decreasing the cooling temperature than at a time of increasing the cooling temperature during a cooling cycle operation, while the heating temperature is shifted more slowly at a time of increasing the heating temperature than at a time of decreasing the heating temperature during a heating cycle operation.

* * * * *